Patented May 20, 1947

2,420,688

UNITED STATES PATENT OFFICE 2,420,688

PRODUCTION OF STYRENES AND OTHER PRODUCTS

Murray Gray Sturrock and Thomas Lawe, Montreal, Quebec, Canada, assignors to Dominion Tar & Chemical Company Limited, Montreal, Quebec, Canada No Drawing. Application October 9, 1944, Serial No. 557,936. In Canada September 29, 1944

8 Claims. (Cl. 260—668)

This invention relates to the production of styrenes and other products by simple molecular decomposition of asymmetric diaryl substituted paraffins and particularly by a convenient and economical method of treating benzol still residues.

Benzol still residues produced in large quantities during the distillation of light oils which are produced along with gas in coke oven and gas works operation, are at present used mainly as fuels, although they contain potentially much more valuable products. In normal practice unsaturated materials in the light oil such as coumarone, indene and styrene are rendered less volatile by treating the crude light oils with concentrated sulphuric acid and diluting with water prior to the final distillation. By this treatment a large proportion of the styrene in the light oil combines with other constituents therein to form phenyl aryl ethanes such as phenyl xylyl ethane. After distillation of the light oil the still residue may be further distilled to recover the phenyl aryl ethanes.

In our prior application Serial No. 331,382, for Production of styrenes and other products, filed April 24, 1940, of which this application is a continuation in part, we have described a method of producing styrenes and other products by simple molecular decomposition of asymmetric diaryl substituted paraffins such as those produced by the distillation of benzol still residues by passing the latter through a suitable tube filled with a finely divided catalyst which promotes simple molecular decomposition and heated to a temperature to convert the diaryl substituted paraffin to a styrene or the like without loss of hydrogen. Generally the reaction may be carried out at temperatures between about 350° C. and 500° C., while higher temperatures of the order of 600° C. may advantageously be used in some instances.

An object of the present invention is to provide an improved method of producing styrenes by simple molecular decomposition of asymmetric diaryl substituted paraffins whereby products having a higher degree of purity are obtained.

Another object of the present invention is to provide a method of the aforementioned type which enables one to attain a higher capacity for a given conversion unit.

Still another object of the present invention is to provide a process of converting asymmetric diaryl ethanes into styrenes and the like which prolongs the life of the catalyst which is employed.

These and other objects are attained by feeding a vapor comprising a compound of the class consisting of asymmetric diaryl substituted paraffins and their nuclear substituted derivatives having at least 2 carbon atoms in the paraffin chain to a hydrated aluminum silicate catalyst at a temperature of at least 350° C., at such a rate as to provide a contact time (as defined below) between about 0.004 and 0.4 sec. It is preferable that the vapor contain a relatively high proportion of diluent, namely from about 5–25 mols of diluent per mol of diaryl-ethane. This is by reason of the fact that the engineering problems involved are much simplified if a diluent be used in order to obtain the short contact times of vapor and catalyst which produces a good yield of very pure product. The preferred diluent is water because of the fact that the water vapor may be easily condensed and thereby separated from the final product and because of the fact that water vapor apparently maintains the catalyst in a highly active condition.

The following examples, in which the proportions are in parts by weight, are given by way of illustration and not in limitation.

Example 1

About 460 parts of a hydrated aluminum silicate catalyst are packed into a tube and heated and maintained at a temperature of about 470° C. About 777 parts of alpha, alpha ditolyl ethane together with 3500 parts of benzene are passed through the heated tube containing the catalyst at the rate of 17.14 mols of ditolyl ethane per hour and at the rate of 208 mols of benzene per hour. About 4,222 parts of product are obtained after condensation and this product includes 3,838 parts of light oil boiling below 200° C., 353 parts of unchanged ditolyl ethane and 31 parts of high boiling residue and distillation loss. Upon fractionation of the light oil 3,427 parts of benzene, 185 parts of toluene, 219.5 parts of methyl styrene are obtained, leaving a balance of 7 parts which is lost during the fractionation.

By circulating the unchanged ditolyl ethane through the heated tube together with the same relative proportion of benzene mentioned above and separating and combining the light oil products obtained, after 3 passages through the tube, about 692 parts of benzene free light oil boiling below 200° C., 48 parts of unchanged ditolyl ethane and 15 parts of a high boiling oil are obtained, leaving a loss of 22 parts due to carbon, gas and mechanical losses.

Upon fractionation of the 692 parts of light oil, 312 parts of toluene, 354 parts of p-methyl styrene are obtained leaving a balance of 26 parts lost during the fractionation. This represents a yield of methyl styrene of 86.4% of the theoretical amount calculated on the basis of the starting material actually consumed.

The molal ratio of benzene to ditolyl ethane in the vapor in this example is about 12.2:1 while the contact time is 0.08 second.

*Example 2*

About 400 parts of a hydrated aluminum silicate catalyst, which is in the form of small pellets which are more or less cubes about 2 mm. along each edge, are packed into a suitable reaction tube. The tube is heated and maintained at about 460° C. while about 1565 parts of alpha, alpha ditolyl ethane together with 2120 parts of water are passed through the tube at the rate of 33.8 mols per hour of ditolyl ethane and 541.4 mols per hour of water. About 1560 parts of product are obtained after condensation and this product includes 541 parts of a light oil boiling below 200° C., 1012 parts of unchanged ditolyl ethane and 7 parts of high boiling oil and fractionation loss.

By recirculating the unchanged ditolyl ethane through the tube and separating and combining the light oil products, about 1317 parts of light oil, 223 parts of unchanged ditolyl ethane and 12 parts of high boiling oil are obtained after four passages through the tube, during which there is a pyrolysis loss of 13 parts.

The light oil obtained in accordance with the above procedure is fractionated to give 581 parts of toluene and 714 parts of p-methyl styrene with a fractionation residue and loss amounting to 22 parts. On the basis of the ditolyl ethane not recovered this represents a yield of 98.8% of the theoretical amount of toluene and 94.7% of the theoretical amount of p-methyl styrene.

In this example the molal ratio of ditolyl ethane to water is about 1:16 and the contact time is 0.033 second.

*Example 3*

About 400 parts of a hydrated aluminum silicate catalyst, of the type described in Example 2, are packed into one or more reaction tubes of a converter. The converter is heated and maintained at a temperature of about 460–475° C. while 678 parts of alpha, alpha ditolyl ethane together with nitrogen gas are passed through the converter. The rate of feed is about 14.8 mols per hour of ditolyl ethane and about 175 mols per hour of nitrogen. The product is condensed thereby yielding 668 parts of condensed oil which is fractionated into 238 parts of light oil boiling below 200° C., 427 parts of unchanged ditolyl ethane leaving a balance of 3 parts of high boiling residue and distillation loss. Upon fractionation of the light oil, 109 parts of toluene and 127 parts of p-methyl styrene are obtained leaving a balance of 2 parts of material which is a fractionation loss.

By recirculating the unchanged ditolyl ethane together with nitrogen in the same proportion as indicated above and separating and combining the light oil product obtained after four passages through the tube 520 parts of light oil and 129 parts of unchanged ditolyl ethane are obtained together with 9 parts of a high boiling oil, leaving a balance of 20 parts of material due to carbon, gas and mechanical loss. On fractionation of the light oil 238 parts of toluene and 275 parts of p-methyl styrene are obtained, leaving a distillation loss of 7 parts of material. This represents a yield of p-methyl styrene of 89.0% of the theoretical amount calculated on the basis of the starting material actually consumed.

In this example the molal ratio of nitrogen to ditolyl ethane is about 11.85:1 while the contact time is 0.10 second.

*Example 4*

About 800 parts of a finely divided hydrated aluminum silicate catalyst are packed into a reaction tube and the tube is heated and maintained at a temperature of about 635° C. while 605 parts of alpha, alpha di-(chlorphenyl) ethane together with about 1000 parts of water are passed through the tube at the rate of about 9.09 mols per hour of the di-(chlorphenyl) ethane and about 215 mols per hour of water. About 591 parts of condensed oil are obtained by condensation of the product and upon fractionation of this product 182 parts of light oil and 409 parts of unchanged di-(chlorphenyl) ethane are obtained leaving a balance of about 14 parts which was a high boiling oil and fractionation loss. The light oil is fractionated to give about 79 parts of chlorbenzene and 91.5 parts of chlorstyrene leaving a balance of 11.5 parts as loss and fractionation residue. On the basis of the di-(chlorphenyl) ethane not recovered this represents a yield of 89.9% of the theoretical amount of chlorbenzene and 84.5% of the theoretical amount of chlorstyrene. The ratio of water vapor to di-(chlorphenyl) ethane is about 23.6:1 while the contact time is about 0.14 second.

*Example 5*

About 400 parts of a finely divided aluminum silicate catalyst are packed into a tube which is heated and maintained at a temperature of about 390° C. while 1552 parts of alpha, alpha di-(m-xylyl) ethane together with 2782 parts of water are passed through the tube. These materials are passed through the tube at the rate of about 12.95 mols per hour of the xylyl ethane and at the rate of 307 mols per hour of water. The product is condensed to yield about 1514 parts of condensed oil which upon distillation gives 946 parts of light oil boiling below 200° C., 560 parts of the unchanged xylyl ethane and a balance of 8 parts of high boiling oil and distillation loss. Fractionation of the light oil gives 440 parts of pure m-xylene, 475 parts of di-methyl styrene and a balance of 31 parts of fractionation loss and residue.

By recirculating the unchanged di-(m-xylyl) ethane through the tube and separating and combining the light oil products obtained after two passages through the tube 1288 parts of light oil, 202 parts of unchanged di-(m-xylyl) ethane and 13 parts of a high boiling oil are obtained with a pyrolysis loss of about 49 parts of material. Upon fractionation of the light oil 599 parts of pure m-xylene and 645 parts of dimethyl styrene are obtained leaving a balance of 44 parts of material as the fractionation residue and losses. On the basis of the di-(m-xylyl) ethane consumed this represents a yield of 99.6% of the theoretical amount of m-xylene and 86.2% of the theoretical amount of di-methyl styrene. The dimethyl styrene is apparently a mixture of the $2^4$, and $2^6$, dimethyl styrenes.

In this example the molal ratio of the water to the di-(m-xylyl) ethane is about 23.7:1 while the contact time is 0.065 second.

Example 6

About 617 parts of alpha, alpha ditolyl ethane together with carbon dioxide gas are heated to about 440–450° C. and passed through a converter tube containing about 400 parts of a hydrated aluminum silicate catalyst. The rate of flow is 3,100 parts per hour of ditolyl ethane and about 7880 parts per hour of carbon dioxide. About 592 parts of condensed oil are produced and upon distillation 273 parts of a light oil boiling below 200° C. and 310 parts of unchanged ditolyl ethane are obtained, leaving a distillation loss including high boiling residue amounting to 9 parts. Upon fractionation of the light oil 125 parts of toluene and 145 parts of p-methyl styrene are obtained with a loss of 3 parts during fractionation.

By recirculating the unchanged ditolyl ethane together with the same proportion of carbon dioxide used above, separating and combining the light oil product 497 parts of light oil, 76 parts of unchanged ditolyl ethane and 11 parts of a high boiling oil are obtained with a loss of 33 parts due to carbon gas and mechanical losses. On fractionation of the light oil 222 parts of toluene, 261 parts of p-methyl styrene are produced with a loss of 14 parts. This represents an 85.8% yield of methyl styrene based upon the starting material actually consumed.

The molal ratio of diluent to ditolyl ethane in this example is 12.1:1 and the contact time is about 0.10 second.

Example 7

529 parts of asymmetrical di-(dichlorphenyl) ethane mixed with about 1,506 parts of water and heated to about 630–650° C. are passed through a converter tube containing about 460 parts of kaolin and the products are condensed to form 473 parts of a light-yellow coloured oil leaving a loss of 56 parts due to pyrolysis. The condensed oil is distilled at an absolute pressure of about 26 mm. of mercury to yield 57 parts of a light oil boiling under 200° C. at that pressure. This light oil containing dichlor styrene may be separated from the ortho dichlor benzene also produced and purified by fractionation. Contact times between 0.1 and 0.4 second are desirable in this instance.

Our process provides a convenient and economical method for converting the 1,1 diaryl substituted paraffins or their nuclear substituted derivatives having at least two carbon atoms in the paraffin chain into mononuclear aromatic hydrocarbons, one of which contains the paraffin chain as an unsaturated vinyl side-chain.

The diaryl substituted paraffins or hydrocarbon oils containing them, such as those produced by the distillation of benzol still residues, are passed through a converter containing a finely divided catalyst of the type described herein. This converter may be a tube constructed of steel, silica, or any other desirable material. Furthermore, in large scale operations the converter may comprise a plurality of such tubes, or it may be a shell type of converter having one or more layers or trays of catalyst therein.

Since no great amount of heat is evolved or taken up by this reaction, it is only necessary to make provision for supplying sufficient heat to take care of the conduction and radiation losses in order to maintain the reaction temperature of the vapors passing through the catalyst. Accordingly, we prefer to preheat the reacting material and supply the vapors to the catalyst at the desired reaction temperature.

The following are illustrative of the raw materials which may be subjected to the treatment of the invention: asymmetric diphenyl ethane, asymmetric phenyl tolyl ethane, asymmetric ditolyl ethane, asymmetric phenyl xylyl ethane, asymmetric tolyl xylyl ethane, asymmetric di-xylyl ethane, alpha, alpha diphenyl propane, alpha, alpha phenyl tolyl propane, alpha, alpha phenyl xylyl propane, alpha, alpha ditolyl propane, alpha, alpha tolyl xylyl propane and the like and their nuclearly substituted halogen, hydroxyl, and the like derivatives which are volatile at the temperature and pressure used in the process.

Activated siliceous catalysts, including the hydrated aluminum silicates, are suitable for our process. We have found that aluminum silicates are effective and we have also found that those catalysts having the relatively higher ratios of silica to aluminum are the most active. However, it has also been found that the more highly active catalysts for a given time of contact are likely to cause the formation of more aromatic hydrocarbon having a saturated side-chain and consequently less of the aromatic hydrocarbon having a vinyl group. This also depends somewhat upon the reaction temperatures and the contact time of the vapor with the catalyst. Accordingly, if highly active catalysts be employed, it is preferable that the contact time be very short.

The catalyst is employed in a finely divided condition fashioned into pellets which are preferably no larger than about 5 mms. in their greatest diameter. The pellets may be cubical, spherical, or of an irregular granular shape. When large pellets are employed the vapor velocity varies widely between the centre and outside of the pellet, and therefore the contact time at the centre of the pellet is longer than desirable. We find that it is desirable to have the particles as fine as possible in order to reduce the difference between the maximum and minimum vapor velocities which occur in the catalyst bed. Obviously the particle size should not be so small that the catalyst packs thereby causing the vapors to channel through the catalyst instead of passing therethrough in a uniform manner.

The reaction temperature may be varied from about 350° C. up to about 600° C. or even higher in some cases. Temperatures above 600° C. cause some pyrolysis loss but on the other hand some of the diaryl ethanes are not easily decomposed at lower temperatures. It is particularly important to employ a short time of contact when temperatures in the neighborhood of 600° C. are used in order to avoid an undesired amount of loss due to pyrolysis and side reactions.

Any material which is volatile and which does not react with the diaryl ethane nor with the products formed by decomposition of the diaryl ethane may be used as a diluent. Among these, some examples are water, the hydrocarbons (such as benzene and toluene), the fixed gases (such as nitrogen and carbon dioxide), etc. Water vapor is the preferred diluent inasmuch as it may be readily condensed and thereby separated from the products of the reaction, whereas the fixed gases or the hydrocarbons are somewhat more difficult to separate from the product and such separation requires higher expenditures than are required for the separation of water from the product. Water vapor also has an additional advantage in that it maintains the catalyst in highly active form.

One of the most important reasons for the use of a diluent is that the time of contact of the aromatic compound with the catalyst can be reduced to the desired point easily. It has been found that in order to obtain the short contact times which are desirable in accordance with the present invention the molal ratio of diluent to the diaryl hydrocarbon in the feed to the catalyst is preferably between about 5:1 and 25:1. If the feed can be supplied rapidly enough to provide a low contact time without the use of a large proportion of diluent the ratio of diluent to diaryl hydrocarbon may be as low as 1:2.

In order to obtain a high yield of pure vinyl substituted aromatic compound in accordance with the present invention, the velocity of the vapors containing diaryl ethane which are fed to the catalyst should be maintained at such a rate as to provide a time of contact of the vapor with the catalyst between about 0.004 second and about 0.4 second.

The calculation of the contact time of the vapor with the catalyst is a relatively complex matter, and in order to simplify this calculation we have used the term "contact time" herein to mean those values which are computed on the assumption that the catalyst contains 50% voids and neglecting both the pressure drop through the catalyst and the increase in volume which occurs during the reaction.

We prefer to employ the shortest possible contact time consistent with a substantial conversion of the diaryl ethane to a relatively pure vinyl aromatic compound together with a similar proportion of an aromatic compound containing no vinyl group. We have found that it is frequently desirable to convert only a few percent of the diaryl ethane fed to the catalyst in one pass but by recirculating the unconverted diaryl ethane from one to five times or more, a high yield is obtained very economically.

One of the advantages of employing a short contact time with the catalyst of the reacting material is that the life of the catalyst is prolonged almost indefinitely. With contact times of the order of 1 second or more the catalyst becomes fouled in a relatively short period of time due to the deposition of carbonaceous materials on the surface of the catalyst. When it is necessary or desirable to reactivate the catalyst this may be done by passing heated air, preferably mixed with steam, through the catalyst. The temperature of the air and steam mixture should be raised to about 590–650° C. The air enables the carbon to burn, whereas the steam which is used in conjunction with the air keeps the temperature from rising too high, which might cause a reduction in the activity of the catalyst. Generally at temperatures of about 590° the carbon begins to burn off and the heat of this reaction causes the temperature to rise to about 650°, say, without the application of any external heat.

It may be seen that the proximity of the reactivation temperature to the reaction temperature greatly simplifies the change from normal operation to reactivation and back to normal operation. Since the normal highly active life of the catalyst greatly exceeds the time required for its reactivation in this manner, the operation of two or more converters in parallel is readily accomplished. The short time of reactivation enables one to keep one or more converters in normal operation while one or more other converters are being reactivated.

Our process may be operated at elevated or reduced pressure, and under some conditions it is particularly advantageous to operate under reduced pressure. If the diaryl ethane which is to be decomposed is not readily volatile at ordinary pressure reduced pressures may be used thereby facilitating the operation of our process.

We claim:

1. In a method of producing mononuclear aromatic compounds, the steps which comprise heating one of a class of substances consisting of asymmetric diaryl substituted paraffins and their nuclear substituted derivatives having at least two carbon atoms in the paraffin chain at a temperature of at least 350° C., and passing the heated substance through a finely divided catalyst which promotes simple molecular decomposition at such a rate as to provide a contact time with the catalyst between about 0.004 second and about 0.4 second.

2. In a method of producing mononuclear aromatic compounds, the steps set forth in claim 1 wherein the catalyst is a hydrated aluminum silicate.

3. In a method of producing mononuclear aromatic compounds, the steps which comprise heating one of a class of substances consisting of asymmetric diaryl substituted paraffins and their nuclear substituted derivatives, having at least two carbon atoms in the paraffin chain, at a temperature of at least 350° C., passing the heated substance through a siliceous catalyst which promotes simple molecular decomposition together with a diluent at such a rate as to provide a contact time with the catalyst between about 0.004 second and about 0.4 second.

4. In a method of producing mononuclear aromatic compounds, the steps set forth in claim 3 wherein the diluent is water vapor.

5. In a method of producing mononuclear aromatic compounds, the steps which comprise passing a mixture including a diaryl substituted paraffin having at least two carbon atoms in the paraffin chain and having two aryl substituents attached to one carbon atom thereof and water vapor through a catalyst which promotes simple molecular decomposition and which is a hydrated aluminum silicate at such a rate as to provide a contact time with the catalyst between about 0.004 second and 0.4 second while maintaining said mixture at a reaction temperature of at least 350° C.

6. In a method of producing mononuclear aromatic compounds, the steps set forth in claim 5 wherein the molal ratio of the water vapor to said diaryl substituted paraffin is at least 2:1.

7. In a method of producing mononuclear aromatic compounds, the steps set forth in claim 5 wherein the molal ratio of the water vapor to said diaryl substituted paraffin is between about 5:1 and 25:1.

8. In a method of producing mononuclear aromatic compounds including p-methyl styrene, the steps which comprise passing a mixture including alpha, alpha-ditolyl ethane and water vapor through a hydrated aluminum silicate catalyst which promotes simple molecular decomposition at such a rate as to provide a contact time with the catalyst between about 0.004 second and 0.4 second while maintaining said mixture at a reaction temperature of at least 350° C.

MURRAY GRAY STURROCK.
THOMAS LAWE.

REFERENCES CITED

The following references are of record in the file of this patent:

UNITED STATES PATENTS

| Number | Name | Date |
|---|---|---|
| 2,110,829 | Dreisbach (A) | Mar. 8, 1938 |
| 2,182,313 | Dreisbach (B) | Dec. 5, 1939 |

OTHER REFERENCES

Sheibley et al., Jour. Am. Chem. Soc., vol. 62, 840–1 (1940). (Copy in Pat. Off. Lib.)